(12) United States Patent
Onishi et al.

(10) Patent No.: US 7,649,680 B2
(45) Date of Patent: Jan. 19, 2010

(54) WAVELENGTH CONVERTING APPARATUS

(75) Inventors: Toshiki Onishi, Osaka (JP); Hiroshi Kitano, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/389,047

(22) Filed: Feb. 19, 2009

(65) Prior Publication Data

US 2009/0207480 A1 Aug. 20, 2009

(30) Foreign Application Priority Data

Feb. 19, 2008 (JP) .............................. 2008-037902

(51) Int. Cl.
*G02F 1/35* (2006.01)

(52) U.S. Cl. .......................... 359/326; 372/22; 372/100

(58) Field of Classification Search ......... 359/326–332; 372/21, 22, 99, 100, 108
See application file for complete search history.

(56) References Cited

U.S. PATENT DOCUMENTS

| | | | | |
|---|---|---|---|---|
| 6,047,011 A | * | 4/2000 | Cook | ............................ 372/22 |
| 6,633,594 B1 | | 10/2003 | Kiriyama et al. | |
| 7,339,719 B1 | * | 3/2008 | Haskett et al. | ................ 359/326 |
| 2008/0259436 A1 | * | 10/2008 | Kamijima | ...................... 359/326 |
| 2009/0147349 A1 | * | 6/2009 | Wu et al. | ....................... 359/326 |

FOREIGN PATENT DOCUMENTS

| | | |
|---|---|---|
| JP | 10-260438 | 9/1998 |
| JP | 2005-106954 | 4/2005 |
| JP | 2007-053159 | 3/2007 |

* cited by examiner

*Primary Examiner*—Hemang Sanghavi
(74) *Attorney, Agent, or Firm*—Hamre, Schumann, Mueller & Larson, P.C.

(57) ABSTRACT

A wavelength converting apparatus that improves output performance of laser light subjected to wavelength conversion while improving the efficiency of laser light wavelength conversion. Wavelength converting apparatus (100) has: nonlinear optical crystal (110) converting wavelength of laser light propagating inside wavelength converting apparatus (100); right angle prism (130) deflecting laser light emanating from nonlinear optical crystal (110) and causing the laser light to be incident on nonlinear optical crystal (110) again, and to propagate in parallel and in opposite directions at a predetermined distance with respect to laser light before emanation from nonlinear optical crystal (110); and first dichroic mirror (120) separating laser light subjected to wavelength conversion inside nonlinear optical crystal (110) from the laser light before incidence on nonlinear optical crystal (110) for a second time.

19 Claims, 17 Drawing Sheets

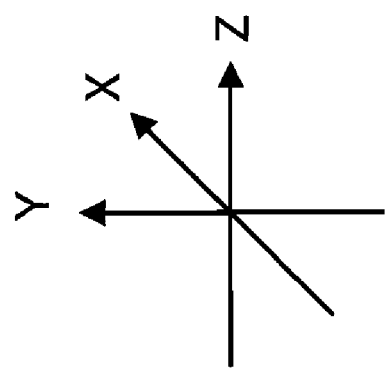
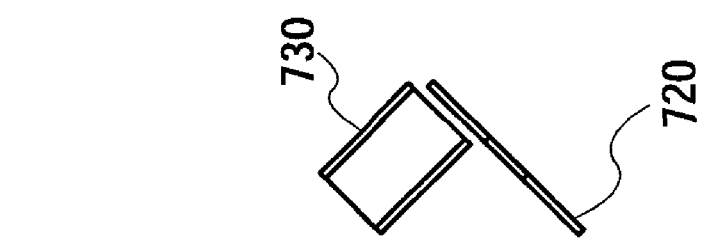
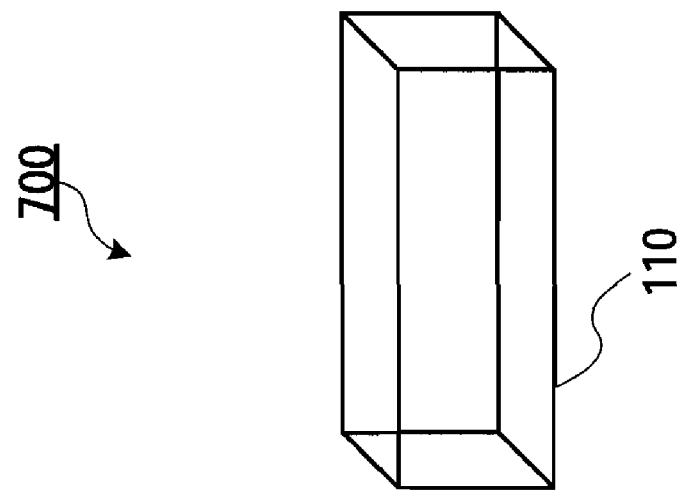
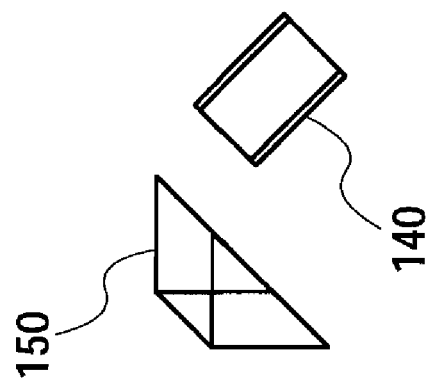
FIG. 14

WAVELENGTH CONVERTING APPARATUS

CROSS REFERENCE TO RELATED APPLICATIONS

The disclosure of Japanese Patent Application No. 2008-037902 filed on Feb. 19, 2008, including the specification, drawings and abstract, is incorporated herein by reference in its entirety.

BACKGROUND

1. Technical Field

The technical field relates to a wavelength converting apparatus for converting the wavelength of incident light and outputting the light using a nonlinear optical crystal.

2. Description of the Related Art

A wavelength converting apparatus that converts the wavelength of laser light using a nonlinear optical crystal is popular because the apparatus is capable of producing laser light having wavelengths that are difficult to produce using laser elements alone.

The efficiency of wavelength conversion of a nonlinear optical crystal generally increases in proportion to the square of the distance of laser light propagation. Therefore, the distance of laser light propagation inside a nonlinear optical crystal is preferably as long as possible. Meanwhile, making a longer nonlinear optical crystal results in increased cost and making large-sized apparatuses.

Then, a technique of making the distance of laser light propagation longer by deflecting laser light inside a nonlinear optical crystal is disclosed in Japanese Patent Application Laid-Open No. 2005-106954, for example.

FIG. 1 is a configuration diagram of the nonlinear optical crystal disclosed in the above patent document. According to the technique disclosed in the patent document, nonlinear optical crystal 10 has input face 11, a plurality of total reflection faces 12 and 13, and output face 14. Laser light 20 before wavelength conversion enters input face 11 at a ninety-degree incident angle. Total reflection faces 12 and 13 reverse the traveling direction of laser light 20 while shifting the position of the traveling direction of laser light 20 entering from input face 11. Output face 14 emits laser light subjected to wavelength conversion inside nonlinear optical crystal 10. This makes it possible to shuttle laser light 20 in the longitudinal direction of nonlinear optical crystal 10 and make the distance of laser light propagation longer in a state nonlinear optical crystal 10 is prevented from being longer.

However, according to the technique disclosed in the above patent document, there is a problem that the output of light subjected to wavelength conversion decreases.

The reason of the above problem is as follows. In nonlinear optical crystal 10, laser light 20 becomes a mixed light of a light whose wavelength is not converted (hereinafter "unconverted light") and of a light whose wavelength is converted (hereinafter "converted light"). However, the refractive index of a nonlinear optical crystal depends on the wavelength, and therefore phase matching is lost between converted light and unconverted light when a mixed light propagates in directions other than the direction phase matching is maintained. With the technique disclosed in the above patent document, although phase matching between converted light and unconverted light is maintained before converted light and unconverted light reflect on total reflection face 12, phase matching is lost when converted light and unconverted light reflect on total reflection face 12 and propagate. Then, wavelength conversion is performed on the unconverted light on the return path in the state phase matching is lost. As a result, converted light subjected to wavelength conversion after reflection and converted light subjected to wavelength conversion before reflection interfere with each other, and therefore the output of converted light decreases. On the other hand, it is very difficult to make adjustment in order to prevent interference between converted light subjected to wavelength conversion after reflection and converted light subjected to wavelength conversion before reflection.

SUMMARY

An object is therefore to provide a wavelength converting apparatus that improves output performance of laser light whose wavelength is converted, while improving the efficiency of laser light wavelength conversion.

The wavelength converting apparatus adopts a configuration including: a nonlinear optical crystal that performs a wavelength conversion of laser light propagating inside the nonlinear optical crystal: a light deflection section that causes laser light that has exited from the nonlinear optical crystal to deflect and re-enter the nonlinear optical crystal, and to propagate in parallel, in an opposite direction, at a predetermined distance with respect to the laser light before exiting from the nonlinear optical crystal; and a light separation section that separates laser light whose wavelength is converted inside the nonlinear optical crystal, from the laser light before re-entering the nonlinear optical crystal.

Laser light is deflected and re-enters a nonlinear optical crystal. Then, before the wavelength of this deflected laser light is converted again, converted light is separated from the laser light, which is mixed light of unconverted light and converted light where phase difference occurs. This makes it possible to prevent mixed light that does not maintain phase matching from producing, and improve output performance of laser light whose wavelength is converted, while improving the efficiency of laser light wavelength conversion. Further, by removing converted light, it is possible to reduce the thermal lens effect of a nonlinear optical crystal and improve conversion efficiency, and, furthermore, gain an advantage of lightfastness of the crystal.

BRIEF DESCRIPTION OF THE DRAWINGS

FIG. 14 is a perspective view showing an outline of the wavelength converting apparatus according to Embodiment 7;

DETAILED DESCRIPTION OF THE PREFERRED EMBODIMENT

Embodiments of the present invention will be described below in detail with reference to the accompanying drawings.

Embodiment 1

Figure 1:
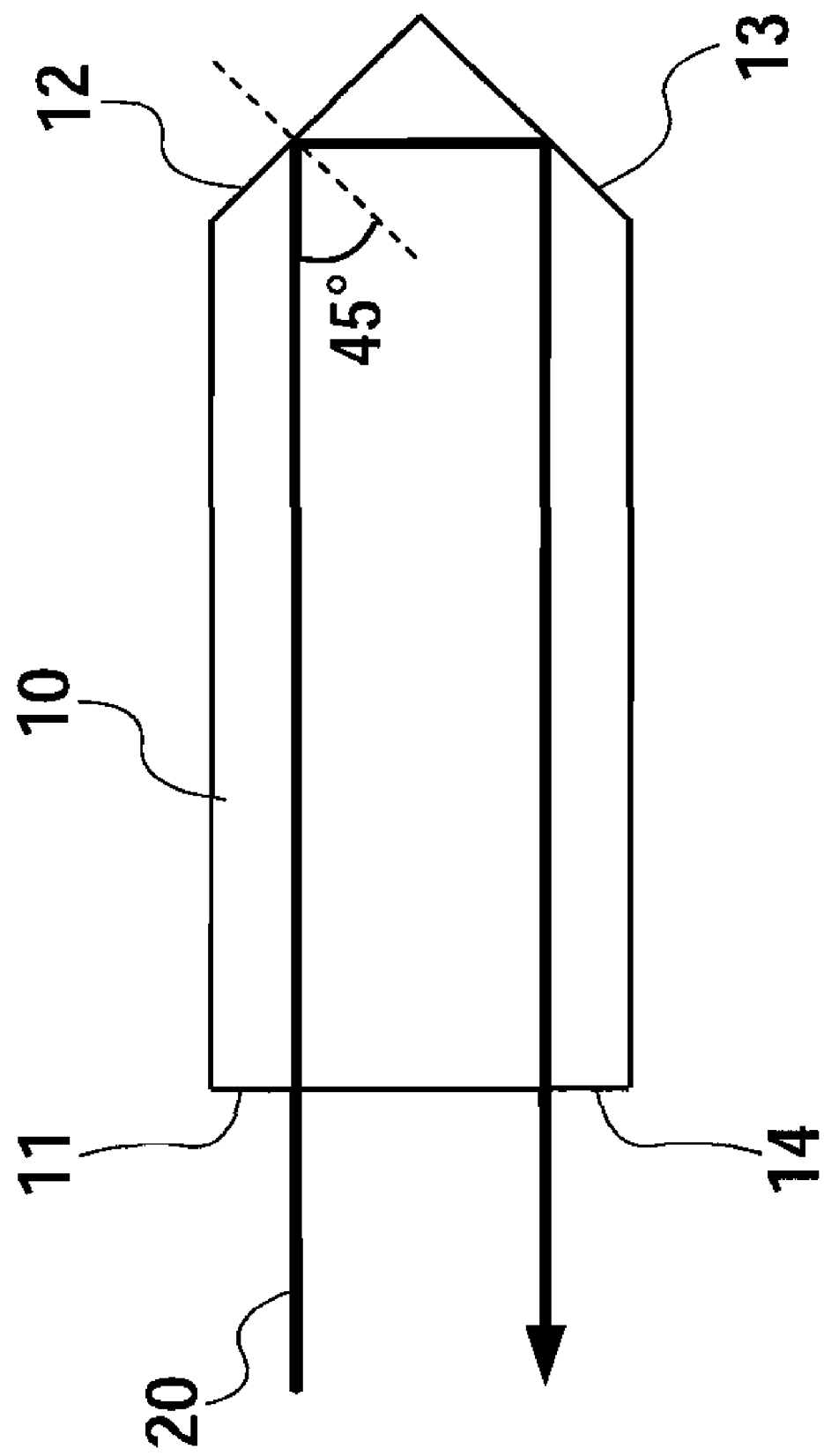
FIG. 1 shows an example of the configuration diagram of the nonlinear optical crystal forming a conventional wavelength converting apparatus.
Figure 2:
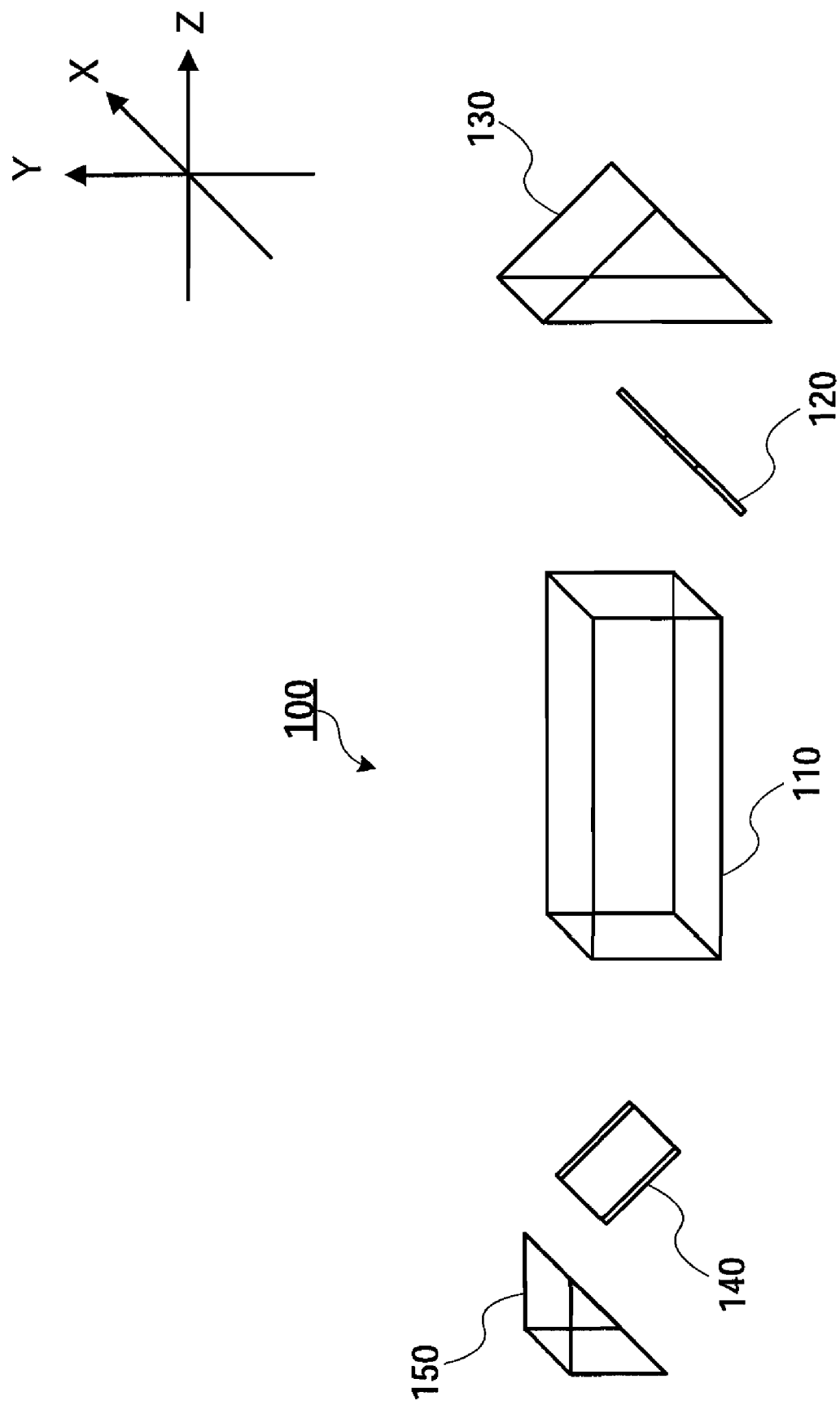
FIG. 2 is a perspective view showing an outline of the wavelength converting apparatus according to Embodiment 1.

FIG. 2 shows a perspective view showing an outline of the wavelength converting apparatus according to Embodiment 1.

Referring to FIG. 2, wavelength converting apparatus 100 has nonlinear optical crystal 110, first dichroic mirror 120, first right angle prism 130, second dichroic mirror 140 and second right angle prism 150.

Nonlinear optical crystal 110 has a shape of a right prism. Hereinafter, in all of the figures, the right direction in the right and left directions on paper, that is, the longitudinal direction of nonlinear optical crystal 110, is the positive direction along the Z axis. The upward direction in the up and down directions on paper is the positive direction along the Y axis. The back direction perpendicular to the right and left directions and the up and down directions on paper is the positive direction along the X axis.

Further, laser light enters nonlinear optical crystal 110 from the negative direction along the Z axis seen from nonlinear optical crystal 110 in FIG. 2, which will be described later.

First right angle prism 130 is placed in the positive direction along the Z axis seen from nonlinear optical crystal 110. Second right angle prism 150 is placed in the negative direction along the Z axis seen from nonlinear optical crystal 110. First dichroic mirror 120 is placed between nonlinear optical crystal 110 and first right angle prism 130. Second dichroic mirror 140 is placed between nonlinear optical crystal 110 and second right angle prism 150.

Figure 3:
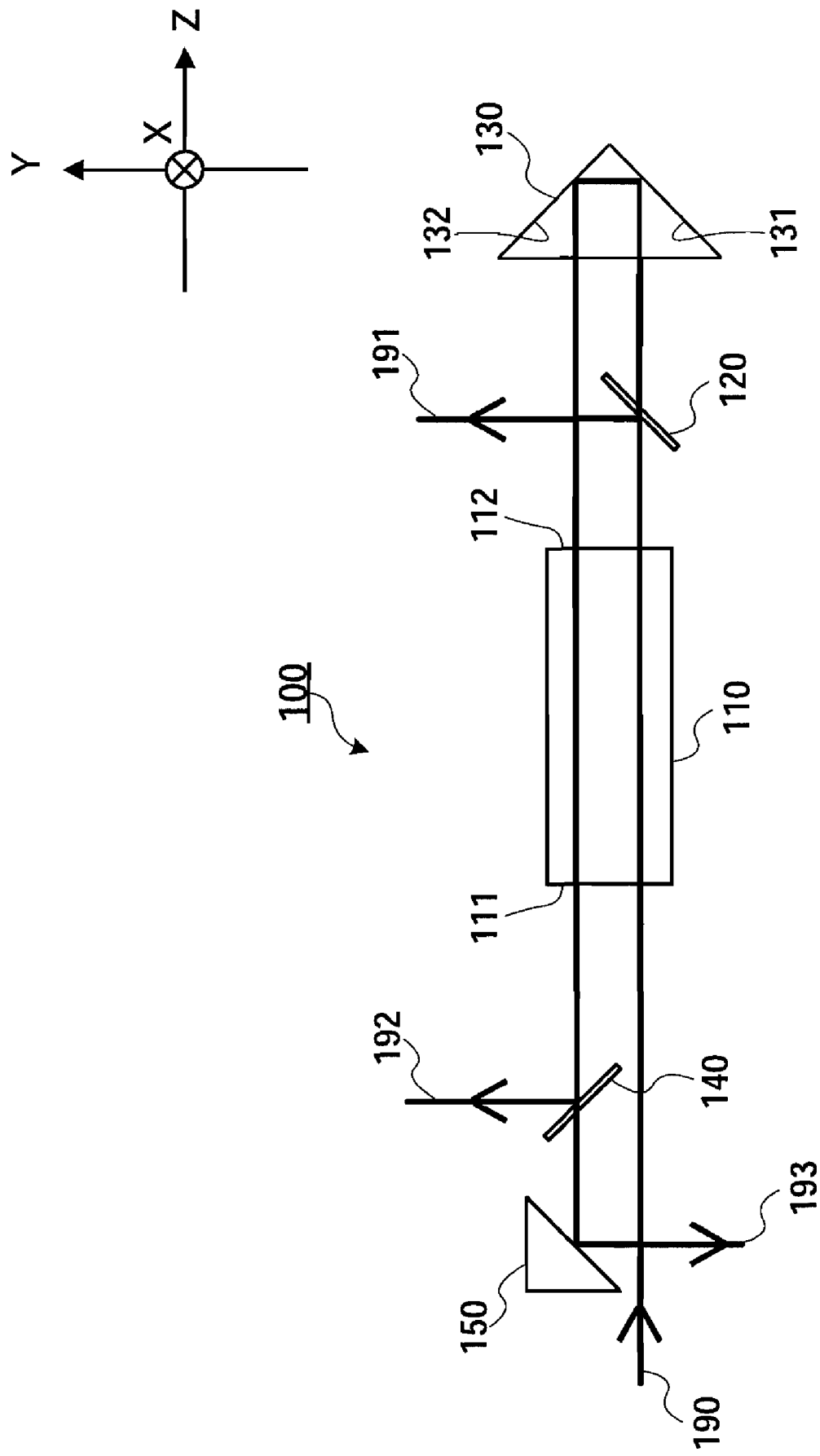
FIG. 3 is a configuration diagram of the wavelength converting apparatus according to Embodiment 1.

FIG. 3 is a configuration diagram of wavelength converting apparatus 100 shown in FIG. 2.

Nonlinear optical crystal 110, which is a harmonic generation element, converts first wavelength light propagating inside nonlinear optical crystal 110 to second wavelength light, according to the distance of propagation. Hereinafter, the light of first wavelength light that is not converted to second wavelength light in nonlinear optical crystal 110 will be referred to as "unconverted light," and second wavelength light will be referred to as "converted light."

Nonlinear optical crystal 110 has first input and output face 111, which is perpendicular to the Z axis and which is placed on the negative side of the Z axis, and second input and output face 112, which is perpendicular to the Z axis and which is placed on the positive side of the Z axis. Referring to FIG. 3, laser light 190 is inputted to first input and output face 111 of nonlinear optical crystal 110 in the Z axial direction and exits from second input and output face 112 on the opposite side of the first input and output face.

Nonlinear optical crystal 110 may use the kinds harmonic generation elements according to purposes such as second harmonic generation (SHG) element, third harmonic generation (THG) element and so on.

First dichroic mirror 120 transmits the first wavelength light of incident light and reflects the second wavelength light of incident light. More precisely, first dichroic mirror 120 reflects the second wavelength light having higher reflectance than the first wavelength light.

First dichroic mirror 120 is placed on the optical path of laser light 190 exiting from second input and output face 112 such that its normal line direction is tilted forty five degrees in the positive direction along the Y axis with respect to the incoming direction of laser light 190. That is, with regards to laser light 190 exiting from second input and output face 112 of nonlinear optical crystal 110, first dichroic mirror 120 reflects and emits the converted light in the positive direction along the Y axis, and, transmits and emits the unconverted light in the positive direction along the Z axis.

First right angle prism 130, having first and second reflecting faces 131 and 132 forming a right angle, emits the light entering first reflecting face 131, from second reflecting face 132, in an opposite direction from the incident direction. In first right angle prism 130, first reflecting face 131 is placed on the optical path of the unconverted light exiting from first dichroic mirror 120. Further, first right angle prism 130 is placed in the direction the unconverted light reflected on first reflecting face 131 and exiting from second reflecting face 132 enters perpendicularly second input and output face 112 of nonlinear optical crystal 110. That is, first right angle prism 130 deflects the unconverted light exiting from first dichroic mirror 120 at one hundred eighty degrees at a predetermined distance in the positive direction along the Y axis, and causes the unconverted light to re-enter nonlinear optical crystal 110.

As in first dichroic mirror 120, second dichroic mirror 140 transmits first wavelength light of incident light and reflects second wavelength light.

Second dichroic mirror 140 is placed on the optical path of laser light 190 exiting from first input and output face 111 such that the normal line direction of second dichroic mirror 140 is tilted forty five degrees in the positive direction along the Y axis with respect to the incoming direction of laser light 190. That is, second dichroic mirror 140 reflects and emits the converted light of laser light 190 exiting from first input and output face 111 of nonlinear optical crystal 110, which is first wavelength light, in the positive direction along the Y axis, and, transmits and emits the unconverted light, which is second wavelength light, in the negative direction along the Z axis.

Second right angle prism 150 is placed on the optical path of the unconverted light exiting from second dichroic mirror 140, and deflects the unconverted light in the negative direction along the Y axis, for example.

In the faces of second right angle prism 150, the face on which the unconverted light exiting from second dichroic mirror 140 enters, is coated to totally reflect laser light. Second right angle prism 150 may be replaced with two total reflection mirrors corresponding to the first reflection face 131 and second reflection face 132. Further, a right angle prism not coated as described above may be configured to be placed in a rotated or inverted manner as appropriate, to deflect laser light 190 using total reflection. The same configuration modification applies to other right angle prisms described later.

In wavelength converting apparatus 100 of this configuration, as shown in FIG. 3, laser light 190 enters input and output face 111 of nonlinear optical crystal 110, propagates inside nonlinear optical crystal 110 and exits from second input and output face 112. Although laser light 190 becomes a mixed light of converted light and unconverted light here, laser light 190 enters first dichroic mirror 120 to be separated into converted light and unconverted light. To be more specific, first output converted light 191 of laser light 190, which is converted light outputted from first dichroic mirror 120, is separated by reflection in the positive direction along the Y axis. Further, the remaining unconverted light of laser light 190 passes through first dichroic mirror 120 and travels toward first right angle prism 130.

Laser light 190, which then includes only unconverted light, is deflected and turned back by first right angle prism 130, re-enters nonlinear optical crystal 110 from second input and output face 112, and, propagates inside nonlinear optical crystal 110 and exits from first input and output face 111. Although laser light 190 becomes a mixed light of converted light and unconverted light here, laser light 190 enters second dichroic mirror 140 to be separated into converted light and unconverted light. To be more specific, second output converted light 192 of laser light 190, which is the converted light outputted from second dichroic mirror 140, is separated in the positive direction along the Y axis due to reflection. Further, the remaining unconverted light of laser light 190 passes through second dichroic mirror 140 and travels toward second right angle prism 150. Laser light 190, which then includes only unconverted light again, is deflected by second right angle prism 150, and exits as output unconverted light 193 in the negative direction along the Y axis, for example.

In this way, in wavelength converting apparatus 100, converted light is separated from laser light 190, which is a mixed light in the forward path to first right angle prism 130, before wavelength conversion is performed for laser light 190 again.

In the deflection by reflection in first right angle prism 130, phase matching between converted light and unconverted light is lost because of material dispersion, and, if wavelength conversion continues in the state phase matching is lost, the output of light whose wavelength is converted decreases. Consequently, wavelength converting apparatus 100 separates converted light from laser light 190 before wavelength conversion on the return path. By this means, even if deflection of laser light 190 is performed between the forward path and the return path, wavelength converting apparatus 100 prevents mixed light that does not maintain phase matching from being produced, and makes it possible to perform high-efficiency laser light wavelength conversion.

Material dispersion is generally caused not only in a case where the deflection means is first right angle prism 130, and a case where the deflection means is a mirror coated with dielectric multilayer or other materials on the surface. Further, coating such as AR (anti-reflective) coating is applied to the input and output end faces of a nonlinear optical crystal. As shown in the following embodiments, when laser light passes through a lens system, material dispersion is caused and phase matching is lost. For that reason, it is effective to separate converted light and unconverted light before wavelength conversion is performed again.

Further, in wavelength converting apparatus 100, the forward path for first right angle prism 130 and the return path therefrom of laser light 190 are placed in parallel at a predetermined distance. This predetermined distance makes it possible to prevent light on the forward path and light on the return path from having influence of optical interference. If laser light 190 is simply turned back, the remaining converted light not separated in first dichroic mirror 120 interferes with the converted light produced on the return path, and it is likely to cause output instability. Consequently, by providing a predetermined distance between the forward path and the return path of laser light 190, wavelength converting apparatus 100 of the present embodiment makes it possible to prevent these problems and acquire stable output. However, taking into account the temperature distribution (described later) in the nonlinear optical crystal, the above-described predetermined distance is preferably provided so as to maximize a conversion efficiency of the entire wavelength converting apparatus 100.

Further, in wavelength converting apparatus 100, the traveling directions of laser light 190 are opposite between the forward path and there turn path. Another advantage because the forward path and the return path are provided in parallel and opposite directions at a short predetermined distance, will be explained using a drawing.

Figure 4:
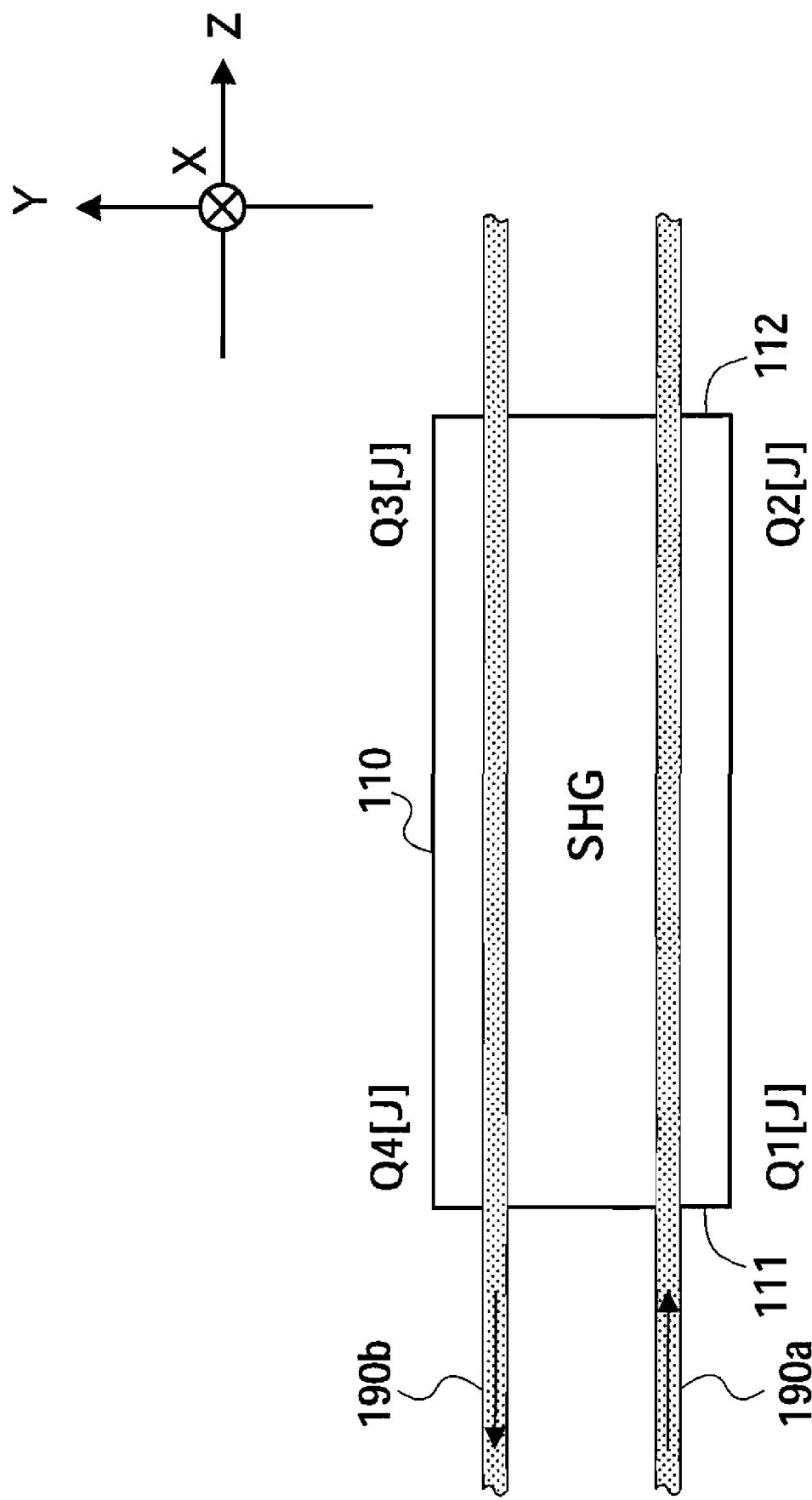
FIG. 4 shows a distribution of heat of the nonlinear optical crystal according to Embodiment 1.

FIG. 4 illustrates for explanation showing a distribution of heat of nonlinear optical crystal 110 shown in FIG. 3. Here, nonlinear optical crystal 110 serves as a second harmonic generation (SHG) element.

A nonlinear optical crystal generally has light absorption properties and produces heat caused by propagation of light. Further, a nonlinear optical crystal absorbs more energy from light having a shorter wavelength, and the amount of heat increases more. Furthermore, as light propagates inside a nonlinear optical crystal, the proportion of converted light increases, so that a distribution of heat (i.e. differences in the amount of heat) is produced between the input side and the output side of the nonlinear optical crystal.

Here, the amounts of heat per unit distance at a position immediately after laser light 190$a$ on the forward path enters, a position immediately before laser light 190$a$ on the forward path exits, a position immediately after laser light 190$b$ on the return path enters and a position immediately before laser light 190$b$ on the return path exits, are Q1 to Q4 [J: joule] in order. Due to the above reason, the amounts of heat Q1 to Q4 fulfill the relationships represented by the following equations 1 and 2.

[1]

$$Q3 < Q1 < Q2 \qquad \text{(Equation 1)}$$

[2]

$$Q3 < Q4 < Q2 \qquad \text{(Equation 2)}$$

In general, to perform high-efficiency wavelength conversion, it is necessary to keep nonlinear optical crystal 110 at a constant temperature. That is, it is not preferable that a distribution of heat (i.e. differences in the amount of heat) is produced on an optical path and causes the distribution of temperatures (i.e. differences in temperature).

Then, nonlinear optical crystal 110 of the present embodiment is formed such that the forward path of laser light 190$a$ and the return path of laser light 190$b$ are in parallel and in opposite directions at a short predetermined distance. This makes it possible to facilitate conduction of heat, cancel out the distribution of temperature and reduce the differences in temperature from the propagation region of laser light 190$b$ on the return path to the propagation region of laser light 190a on the forward path. That is, it is possible to improve the efficiency of wavelength conversion.

As described above, according to the present embodiment, the reflection in first right angle prism 130 allows laser light 190 exiting from nonlinear optical crystal 110 to deflect and re-enters nonlinear optical crystal 110, and to propagate in parallel and in opposite directions at a short predetermined distance with respect to laser light 190 before exiting from nonlinear optical crystal 110. Further, first dichroic mirror 120 separates first output converted light 191 whose wavelength is converted in nonlinear optical crystal 110 from laser light 190 before re-entering. This makes it possible to separate converted light from laser light 190 before wavelength conversion is performed again for deflected laser light 190, prevent mixed light not maintaining phase matching from entering nonlinear optical crystal 110 and prevent output instability due to interference and forming resonator. That is, it is possible to improve output performance of laser light whose wavelength is converted, while improving the efficiency of laser light wavelength conversion.

Further, the forward path and return path of laser light 190 are in parallel and in opposite directions at a short predetermined distance. This makes it possible to average the distribution of temperature and improve the efficiency of wavelength conversion.

Embodiment 2

Figure 5:
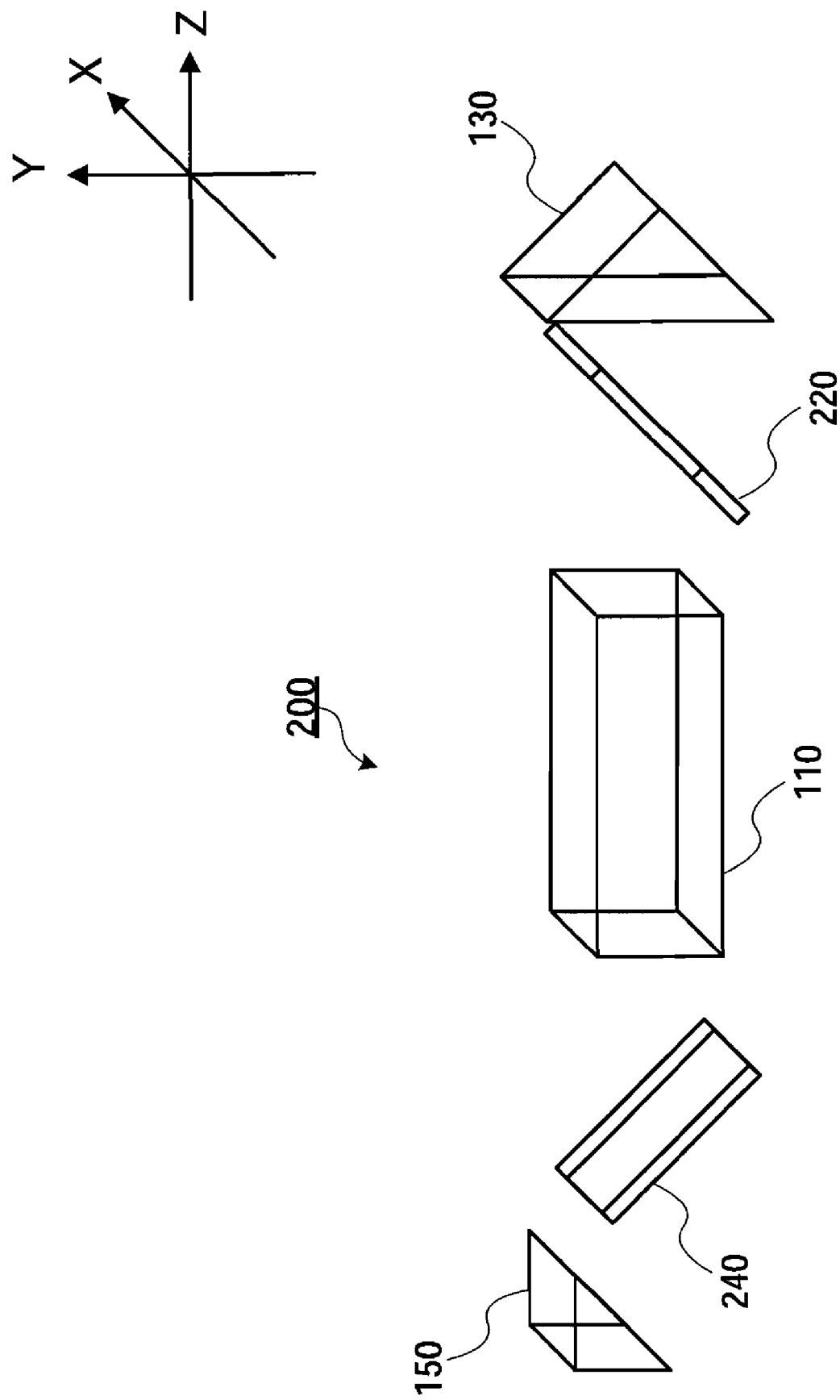
FIG. 5 is a perspective view showing an outline of the wavelength converting apparatus according to Embodiment 2.

FIG. 5 is a perspective view showing an outline of the wavelength converting apparatus according to Embodiment 2, and corresponds to FIG. 2 of Embodiment 1. The same parts as in FIG. 2 are assigned the same numerals, and therefore the explanation thereof will be omitted.

Referring to FIG. 5, wavelength converting apparatus 200 has first dichroic mirror 220 and second dichroic mirror 240 in larger sizes, instead of first dichroic mirror 120 and second dichroic mirror 140.

Figure 6:
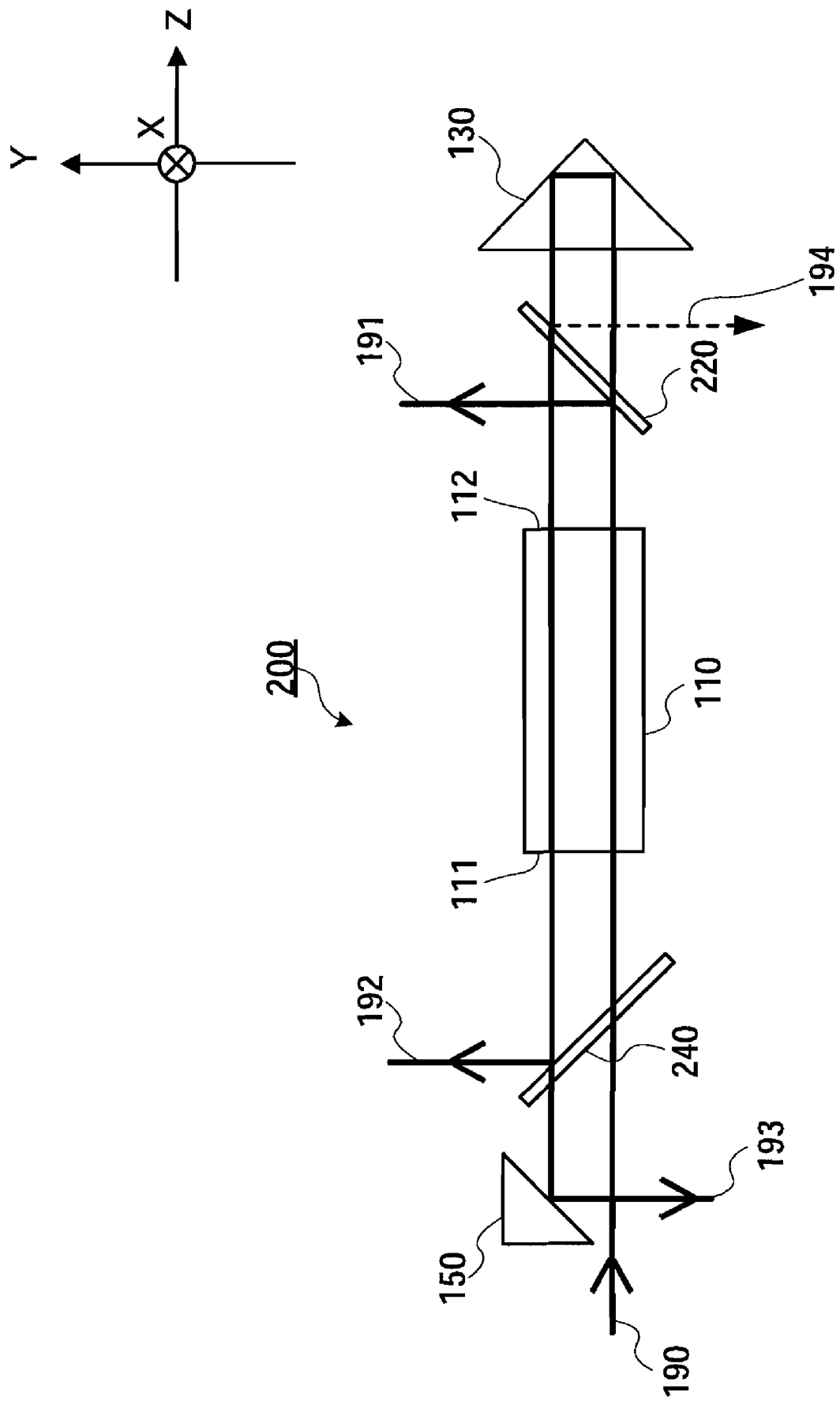
FIG. 6 is a configuration diagram of the wavelength converting apparatus according to Embodiment 2.

FIG. 6 is a configuration diagram of wavelength converting apparatus 200 shown in FIG. 5, and corresponds to FIG. 3 of Embodiment 1.

Referring to FIG. 6, first dichroic mirror 220 and second dichroic mirror 240 are placed on both the forward path and the return path of laser light 190 for and from first right angle prism 130.

As shown in FIG. 6, in wavelength converting apparatus 200 of this configuration, laser light 190 having passed through first dichroic mirror 220 on the forward path re-enters first dichroic mirror 220. Then, the remaining converted light, not separated on the forward path, is separated as surplus converted light 194, in the negative direction along the Y axis by reflection. This makes it possible to separate the remaining converted light on the return path, not separated on the forward path, before wavelength conversion is performed again, and it is possible to reduce the possibility of mixing converted light produced on the forward path into laser light 190 on the return path and reduce the output.

Further, in Embodiment 1 as explained earlier, the size of first dichroic mirror 120 and second dichroic mirror 140 needs to be smaller so as to cross only one of the forward path and the return path of laser light 190. However, if the size of first dichroic mirror 120 and second dichroic mirror 140 is small, cases occur where the cost of manufacturing increases and where accurate positioning is difficult. By contrast with this, according to the present embodiment, it is possible to make first dichroic mirror 220 and second dichroic mirror 240 larger than or equal to the size like dichroic mirrors 220 and 240 cross both the forward path and the return path of laser light 190. Consequently, it is possible to reduce the cost of manufacturing and improve the accuracy of the wavelength converting apparatus.

Embodiment 3

Figure 7:
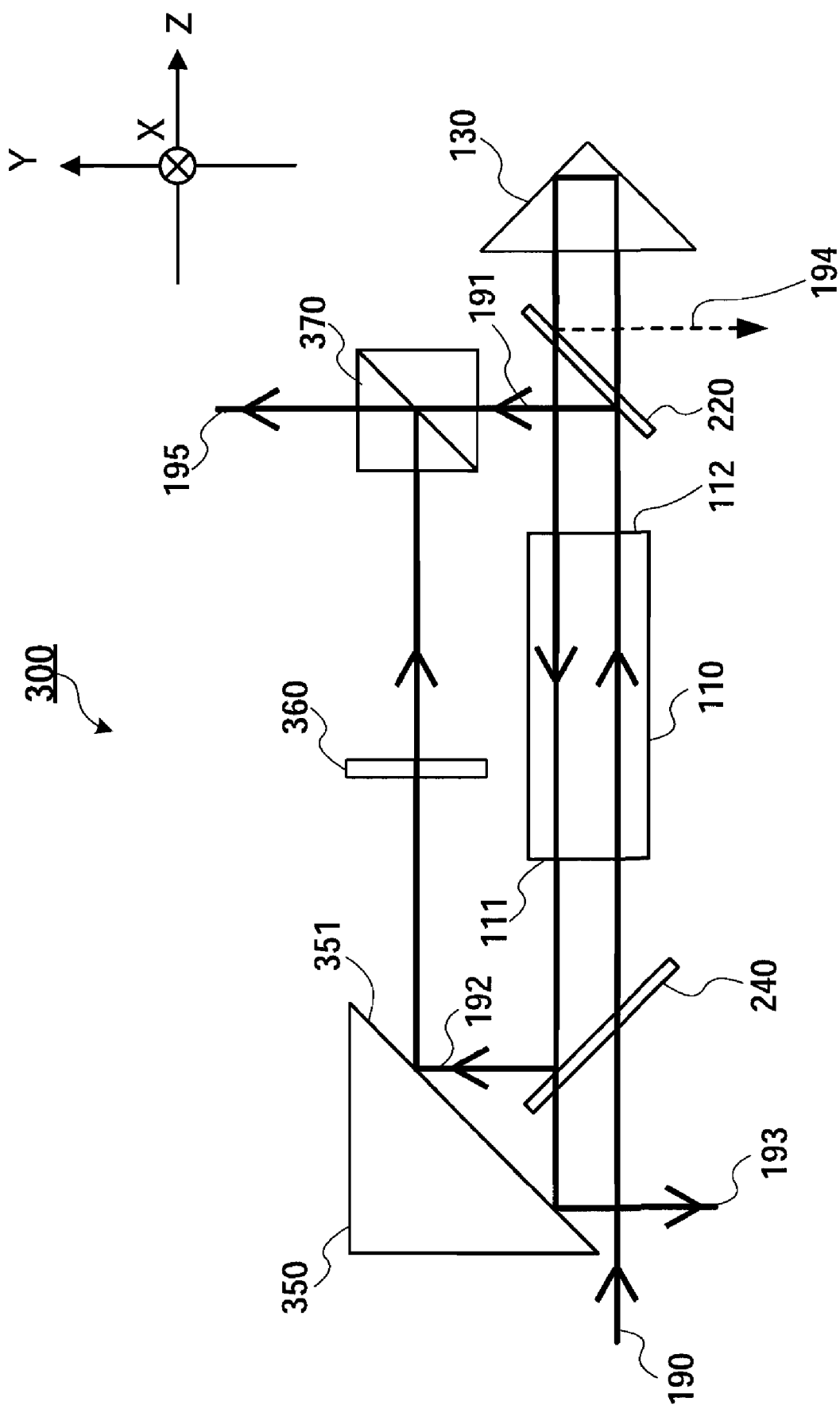
FIG. 7 is a configuration diagram of the wavelength converting apparatus according to Embodiment 3.

FIG. 7 is a configuration diagram of the wavelength converting apparatus according to Embodiment 3, and corresponds to FIG. 6 of Embodiment 2. The same parts as in FIG. 6 are assigned the same numerals, and therefore the explanation thereof will be omitted.

Referring to FIG. 7, wavelength converting apparatus 300 has second right angle prism 350 of larger size, which is replaced with second right angle prism 150 shown in FIG. 6, and further has half-wave plate 360 and polarizing beam splitter 370.

Second right angle prism 350 has the expanded size so as to cross not only laser light 190 exiting from first input and output face 111 of nonlinear optical crystal 110, but second output converted light 192 exiting from second dichroic mirror 240. Second right angle prism 350 has third reflecting face 351 such that its normal line direction is tilted forty five degrees in the positive direction along the Z axis with respect to the incoming direction of second output converted light 192 exiting from second dichroic mirror 240. That is, second right angle prism 350 deflects second output converted light 192 exiting from second dichroic mirror 240 in the positive direction along the Z axis.

half-wave plate 360 rotates ninety degrees its polarization plane of incident light. That is, half-wave plate 360 rotates ninety degrees the polarization plane of second output converted light 192, and causes the polarization direction of second output converted light 192 to be perpendicular to the polarization direction of first output converted light 191 exiting from first dichroic mirror 220.

Polarizing beam splitter 370 combines the incident lights from two predetermined directions and emits combined light. Here, polarizing beam splitter 370 is placed at the position corresponding to the vertex of first output converted light 191 exiting from first dichroic mirror 220 and second output converted light 192 exiting from half-wave plate 360. Further, polarizing beam splitter 370 is placed in the direction so as to combine the first output converted light 191 and second output converted light 192 that have entered, and output the combined light in the positive direction along the Y axis. That is, polarizing beam splitter 370 emits combined converted light 195, which combines first output converted light 191 and second output converted light 192, in the positive direction along the Y axis.

First output converted light 191 and second output converted light 192 do not interfere with each other when propagating with an optical path difference longer than the coherence length. In this case, speckle noise generally decreases. Consequently, by configuring wavelength converting apparatus 300 such that a longer optical path difference than the coherence length is generated, it is possible to acquire a beam light whose wavelength is converted with reduced speckle noise.

Further, second right angle prism 350 deflects the unconverted light and converted light exiting from second dichroic mirror 240, so that it is possible to reduce the number of the components.

Further, light deflection elements may be provided individually to deflect the unconverted light and converted light exiting from second dichroic mirror 240. Further, it is possible to rotate the polarization plane of first output converted light 191, instead of the polarization plane of second output converted light 192. Further, surplus converted light 194 outputted from first dichroic mirror 220 may be combined with first output converted light 191, second output converted light 192 or combined converted light 195, using half-wave plate 360 and polarizing beam splitter 370. Furthermore, it is possible to receive surplus converted light 194 by, for example, a photodiode, and use this reception result in power control of laser light 190 and temperature control of nonlinear optical crystal 110.

Embodiment 4

Figure 8:
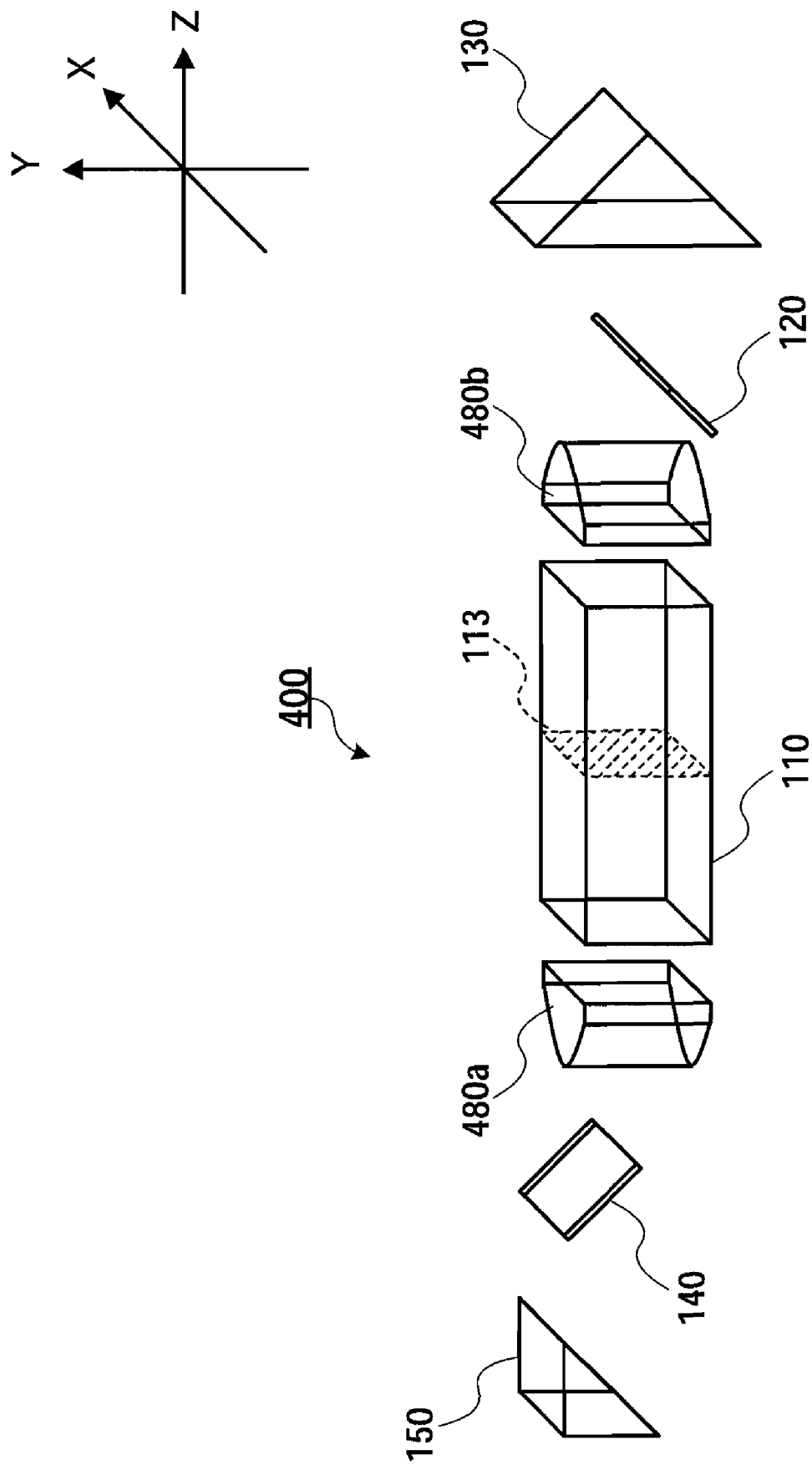
FIG. 8 is a perspective view showing an outline of the wavelength converting apparatus according to Embodiment 4.

FIG. 8 is a perspective view showing an outline of the wavelength converting apparatus according to Embodiment 4, and corresponds to FIG. 2 of Embodiment 1. The same parts as in FIG. 2 are assigned the same numerals, and therefore the explanation thereof will be omitted.

Referring to FIG. 8, wavelength converting apparatus 400 has first cylindrical lens 480*a* and second cylindrical lens 480*b* on the both sides of nonlinear optical crystal 110 in the Z axial direction, in addition to the configuration of wavelength converting apparatus 100 shown in FIG. 2.

First cylindrical lens 480*a* collects parallel light entering from the cylinder surface into the focal point on the plane surface, and, meanwhile, changes light incident from this focal point to parallel light, to emit the parallel light from the cylinder surface. Here, first cylindrical lens 480*a* is placed such that its plane surface opposes first input and output face 111 of nonlinear optical crystal 110 and its optical axis matches with the Z-axial direction. Further, the focal point of first cylindrical lens 480*a* is positioned in plane 113 that passes the center of nonlinear optical crystal 110 in the Z-axial direction and that is perpendicular to the Z axis (hereinafter "crystal center plane").

Second cylindrical lens 480*b* and first cylindrical lens 480*a* are placed so as to have a plane-symmetric shape with respect to crystal center plane 113 of nonlinear optical crystal 110.

Figure 9:
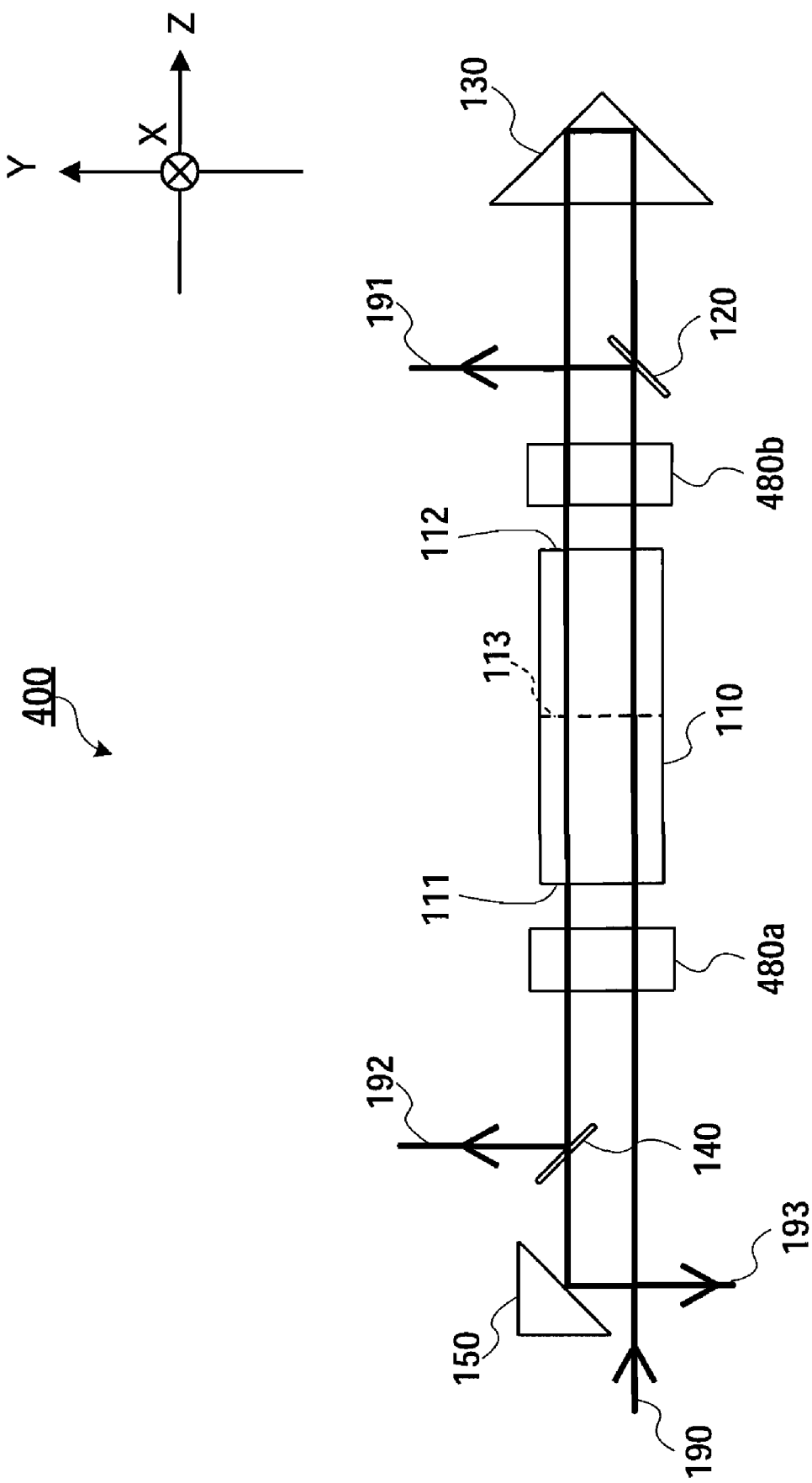
FIG. 9 is a configuration diagram of the wavelength converting apparatus according to Embodiment 4.

FIG. 9 is a configuration diagram of wavelength converting apparatus 400 shown in FIG. 8, and corresponds to FIG. 3 of Embodiment 1.

Referring to FIG. 9, first cylindrical lens 480*a* and second cylindrical lens 480*b* are large such that their central axes cross both the forward path and the return path of laser light 190.

According to this wavelength converting apparatus 400, laser light 190 is narrowed down in the X axial direction in the area between first cylindrical lens 480*a* and second cylindrical lens 480*b* so as to form a beam waist in crystal center plane 113. By this means, the density of incident light in the region that laser light 190 inside nonlinear optical crystal 110 passes increases.

Generally, the efficiency of wavelength conversion by a nonlinear optical crystal improves when its incident light density increases, if the incident light intensity is the same. Consequently, by causing laser light 190 to converge inside nonlinear optical crystal 110, the efficiency of wavelength conversion further improves.

Further, cylindrical lenses 480 are used as the light converging elements, so that it is possible to use one component on the forward path and return path, and reduce the number of lens system components, compared to providing components separately for the forward path and the return path.

Further, cylindrical lenses 480 are placed in the Y-axial direction with high flexibility and easily positioned with high accuracy using a plurality of plane parts, so that it is easy to adjust cylindrical lenses 480 optically.

Laser light 190 propagates as parallel light outside the area between first cylindrical lens 480*a* and second cylindrical lens 480*b* on the forward path and the return path. Consequently, the presence of first cylindrical lens 480*a* and second cylindrical lens 480*b* does not have influence on the separation of converted light and the deflection of laser light 190 in this area.

Although a configuration has been described with the present embodiment where laser light 190 converges on both the forward path and the return path, a configuration may be adopted where laser light 190 converges in only one of the forward path and the return path.

Further, it is possible to place first cylindrical lens 480*a* only and not place second cylindrical lens 480*b*. In this case, the focal point of first cylindrical lens 480*a* is preferably adjusted as appropriate such that the output sum value of first output converted light 191 and second output converted light 192 is maximum, taking into account the length of nonlinear optical crystal 110 and the position of first right angle prism 130.

Embodiment 5

Figure 10:
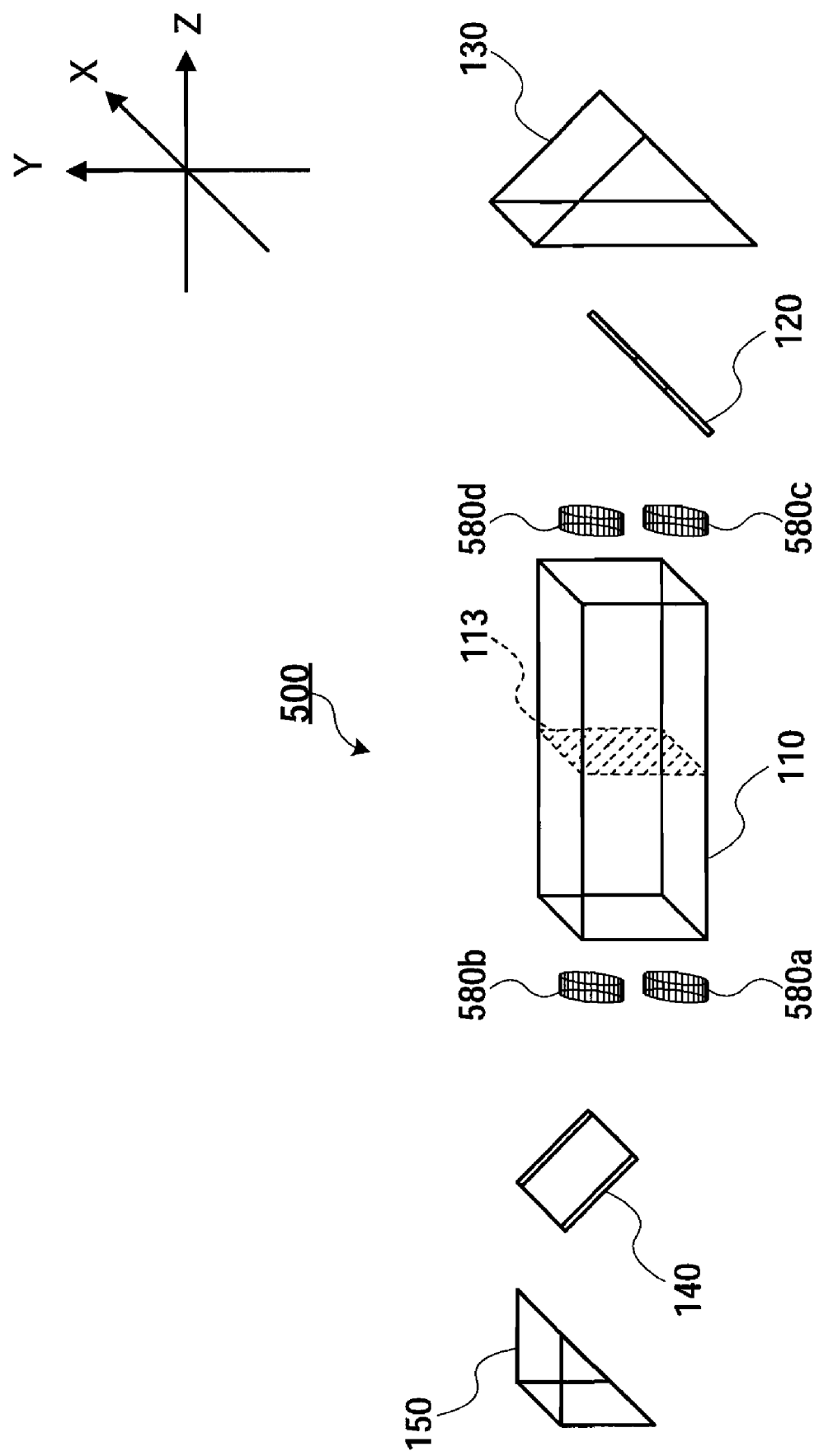
FIG. 10 is a perspective view showing an outline of the wavelength converting apparatus according to Embodiment 5.

FIG. 10 is a perspective view showing an outline of the wavelength converting apparatus according to Embodiment 5, and corresponds to FIG. 8 of Embodiment 4. The same parts as in FIG. 8 are assigned the same numerals, and therefore the explanation thereof will be omitted.

Referring to FIG. 10, wavelength converting apparatus 500 has first microlens element 580*a* to fourth microlens element 580*d* instead of first cylindrical lens 480*a* and second cylindrical lens 480*b* shown in FIG. 8. To be more specific, first microlens element 580*a* and second microlens element 580*b* forming a lens array (not shown) are placed on the side of second right angle prism 150 of nonlinear optical crystal 110, and third microlens element 580*c* and fourth microlens element 580*d* forming another lens array (not shown) are placed on the side of first right angle prism 130 of nonlinear optical crystal 110. First microlens element 580*a* to fourth microlens element 580*d* each has the same configuration.

Microlens elements 580 each condense parallel light entering from one side to the focal point on the other side, and, each emit light entering from the focal point on one side, as parallel light from the other side.

Figure 11:
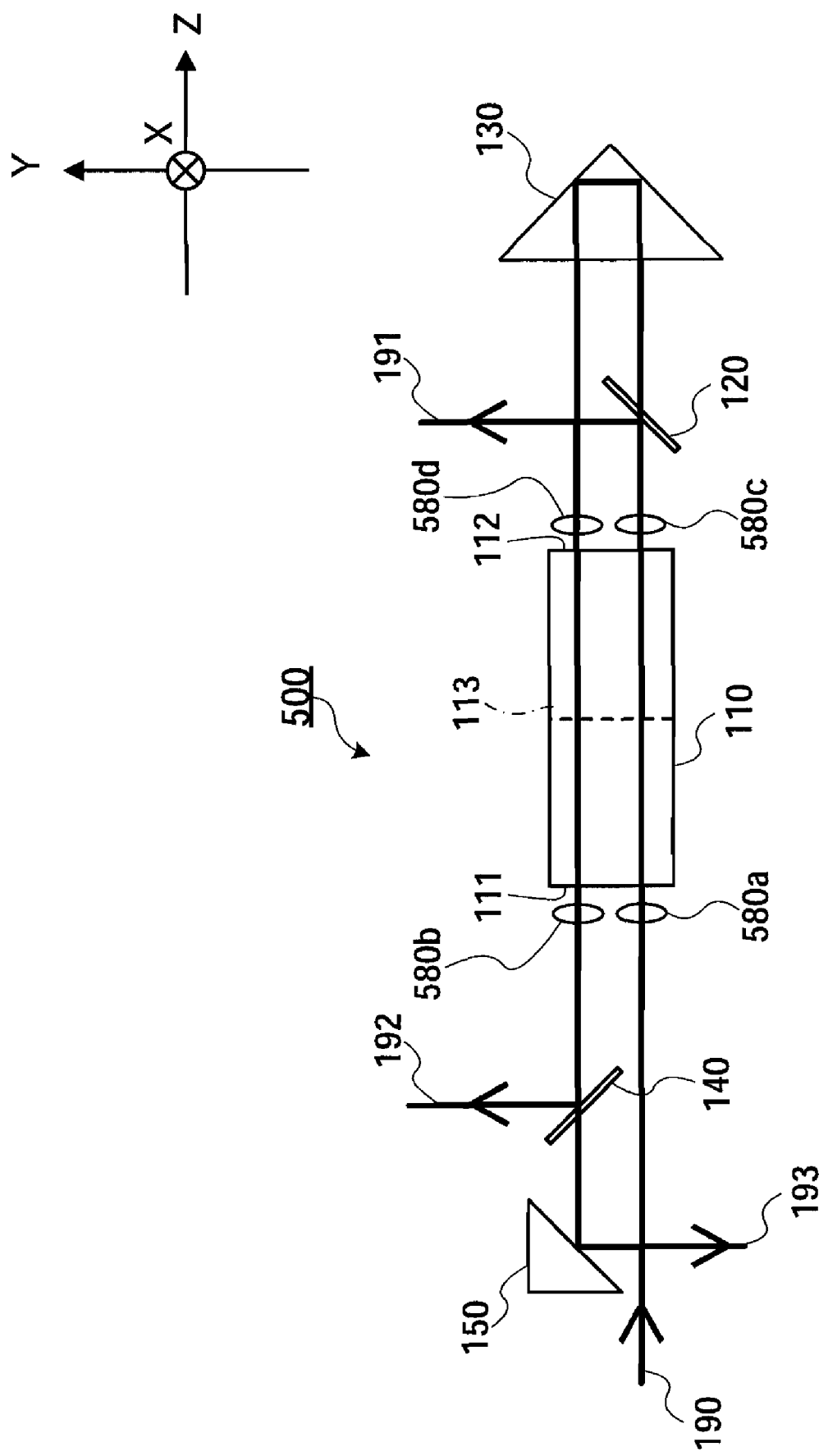
FIG. 11 is a configuration diagram of the wavelength converting apparatus according to Embodiment 5.

FIG. 11 is a configuration diagram of wavelength converting apparatus 500 shown in FIG. 10, and corresponds to FIG. 9 of Embodiment 4.

In FIG. 11, first microlens element 580*a* and second microlens element 580*b* are placed on the forward path and the return path respectively such that one face opposes first input and output face 111 of nonlinear optical crystal 110 and its optical axis matches with the incoming direction of laser light. Further, the focal points of first microlens element 580*a* and second microlens element 580*b* are positioned on crystal center plane 113 of nonlinear optical crystal 110.

Third microlens element 580*c* and fourth microlens element 580*d*, and first microlens element 580*a* and second microlens element 580*b* are placed so as to have a plane-symmetric shape with respect to crystal center plane 113 of nonlinear optical crystal 110, respectively.

According to this wavelength converted apparatus 500, the diameter of laser light 190 is narrowed down in the area between first microlens element 580*a* and third microlens element 580*c* on the forward path so as to form a beam waist in crystal center plane 113. Further, the diameter of laser light 190 is narrowed down in the area between second microlens element 580*b* and fourth microlens element 580*d* on the return path so as to form a beam waist in crystal center plane 113. By this means, the density of incident light of laser light 190 inside nonlinear optical crystal 110 increases.

Further, although in Embodiment 4 as explained earlier, laser light converges in the X-axial direction only, with the present embodiment, laser light converges in two directions, that is, in the X-axial direction and in the Y-axial direction, so that the efficiency of wavelength conversion improves further.

As in Embodiment 2, first dichroic mirror 120 and second dichroic mirror 140 may be large so as to cross both the forward path and the return path of laser light 190. Further, as in Embodiment 3, it is possible to acquire combined converted light 195 by providing half-wave plate 360 and polarizing beam splitter 370.

Embodiment 6

Figure 12:
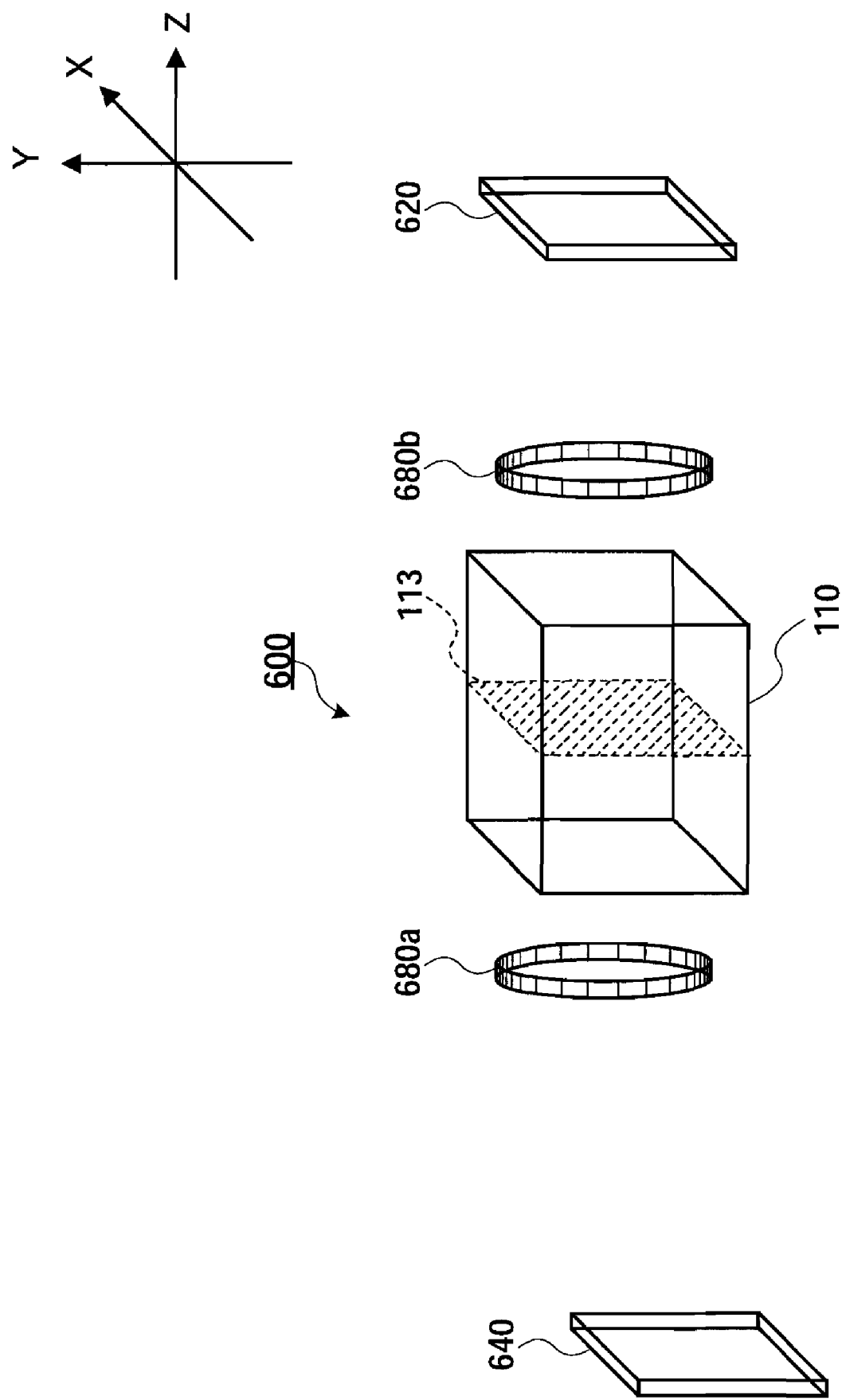
FIG. 12 is a perspective view showing an outline of the wavelength converting apparatus according to Embodiment 6.

FIG. 12 is a perspective view showing an outline of the wavelength converting apparatus according to Embodiment 6, and corresponds to FIG. 8 of Embodiment 4. The same parts as in FIG. 8 are assigned the same numerals, and therefore the explanation thereof will be omitted.

Referring to FIG. 12, wavelength converting apparatus 600 has first lens element 680a and second lens element 680b, instead of first cylindrical lens 480a and second cylindrical lens 480b shown in FIG. 9. Further, wavelength converting apparatus 600 has first dichroic mirror 620, instead of first dichroic mirror 120 and first right angle prism 130, and has second dichroic mirror 640, instead of second dichroic mirror 140 and second right angle prism 150. First lens element 680a and second lens element 680b have the same configuration.

Here, first lens element 680a is placed such that one face opposes first input and output face 111 of nonlinear optical crystal 110 and its optical axis matches with the Z-axial direction.

Second lens element 680b and first lens element 680a are placed so as to have a plane-symmetric shape with respect to crystal center plane 113 of nonlinear optical crystal 110.

Figure 13:
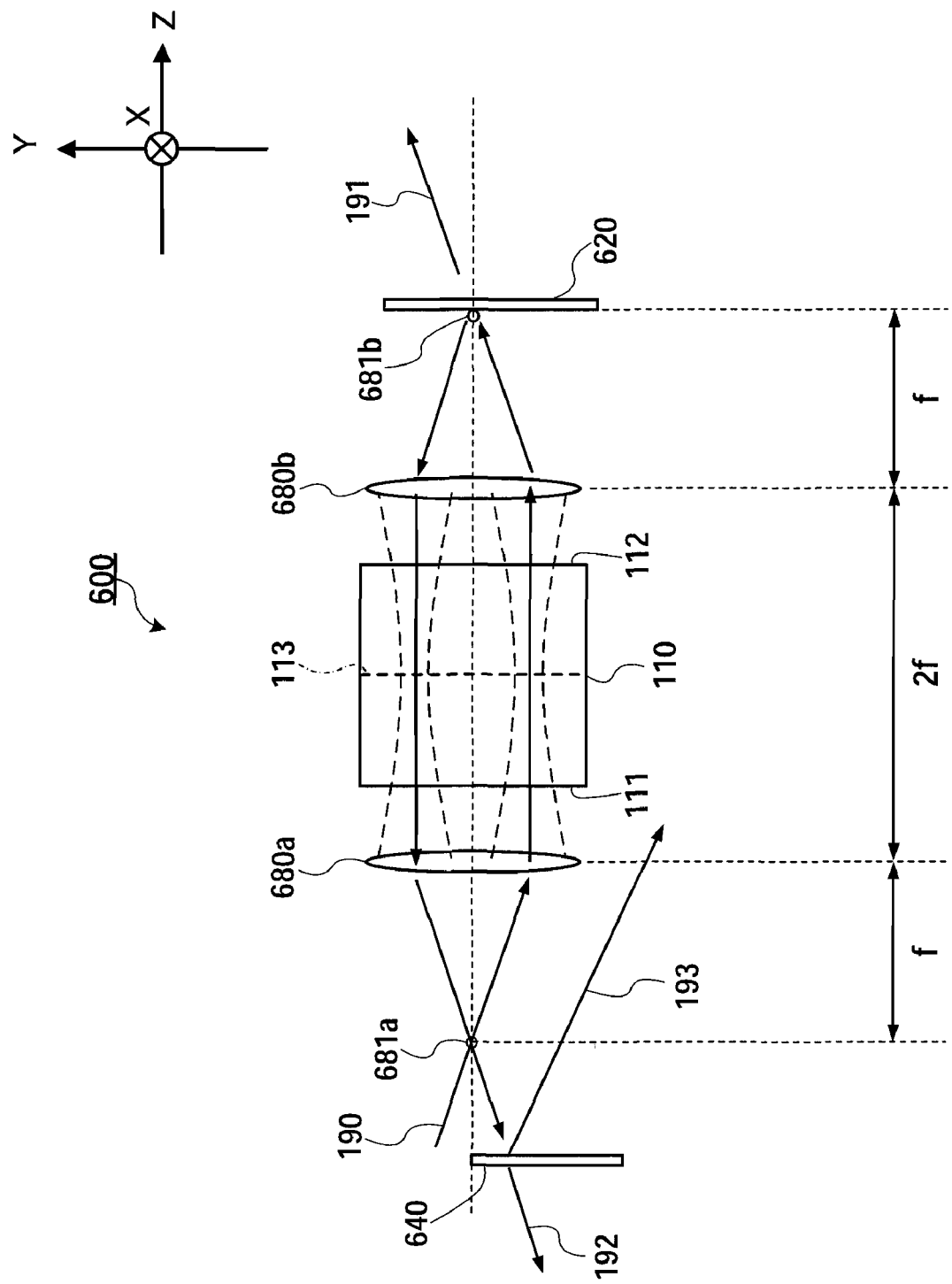
FIG. 13 is a configuration diagram of the wavelength converting apparatus according to Embodiment 6.

FIG. 13 is a configuration diagram of wavelength converting apparatus 600 shown in FIG. 12, and corresponds to FIG. 9 of Embodiment 4.

In FIG. 13, contrary to first dichroic mirror 120 shown in FIG. 9, first dichroic mirror 620 reflects first wavelength light (i.e. unconverted light) and transmits second wavelength light (i.e. converted light). Further, first dichroic mirror 620 is placed in the direction perpendicular to the Z axis, at the position of focal point 681b of second lens element 680b on the opposite side of nonlinear optical crystal 110 with respect to second lens element 680b.

Contrary to second dichroic mirror 140 shown in FIG. 9, second dichroic mirror 640 reflects first wavelength light (i.e. unconverted light) and transmits second wavelength light (i.e. converted light). Further, second dichroic mirror 640 is placed in the direction perpendicular to the Z axis, on the opposite side of nonlinear optical crystal 110 with respect to first lens element 680a. However, second dichroic mirror 640 is placed at the position farther from first lens element 680a than focal point 681a of first lens element 680a positioned on the opposite side of nonlinear optical crystal 110 with respect to first lens element 680a. Further, second dichroic mirror 640 is placed on a virtual optical path, and, the virtual optical path and the optical path of unconverted laser light 190 are placed so as to have a line symmetric shape with respect to the optical axis of first lens element 680a. Unconverted laser light 190 is inputted on first lens element 680a through focal point 681a.

If the focal length of first lens element 680a and second lens element 680b is f and the difference between the refractive indices of nonlinear optical crystal 110 and air is ignored, the distance between first lens element 680a and second lens element 680b is 2f. That is, first lens element 680a and second lens element 680b are placed such that their focal points on the side of nonlinear optical crystal 110 are positioned at the same position on crystal center plane 113 in nonlinear optical crystal 110.

In this wavelength converting apparatus 600, laser light 190 exiting from first lens element 680a travels in the positive direction along the Z axis while laser light 190 is narrowed down as a beam waist on crystal center plane 113 in nonlinear optical crystal 110, and enters second lens element 680b. Then, laser light 190 exiting from second lens element 680b becomes parallel light passing focal point 681b, and is separated into first output converted light 191 and unconverted light in first dichroic mirror 620.

The unconverted light turned back by first dichroic mirror 620 passes focal point 681b. Consequently, as in the forward path to first dichroic mirror 620, this unconverted light is narrowed down inside nonlinear optical crystal 110 by second lens element 680b, and becomes parallel light passing focal point 681a, by first lens element 680a. Then, laser light 190 exiting from first lens element 680a is separated into second output converted light 192 and output unconverted light 193.

Here, a case will be explained where difference between the refractive indices of nonlinear optical crystal 110 and air is taken into account.

If there is a parallel medium of length L and refractive index n along the optical axis, the focal point of lens element 680 is shifted $\alpha = (1-1/n) \times L$ farther. Consequently, taking into account the difference between the refractive indices of nonlinear optical crystal 110 and air, if the length of nonlinear optical crystal is Lp, distance D between first lens element 680a and second lens element 680b is $2\alpha$ longer than 2f, that is, distance D should be set to fulfill the following equation 3.

[3]

$$D = 2f + 2 \times (1 - 1/n) \times Lp/2$$
$$= 2f + (1 - 1/n) \times Lp$$

(Equation 3)

Embodiment 7

FIG. 14 is a perspective view showing an outline of the wavelength converting apparatus according to Embodiment 7, and corresponds to FIG. 2 of Embodiment 1. The same parts as in FIG. 2 are assigned the same numerals, and therefore the explanation thereof will be omitted.

Referring to FIG. 14, wavelength converting apparatus 700 has first dichroic mirror 720 and total reflection mirror 730, instead of first dichroic mirror 120 and first right angle prism 130.

First dichroic mirror 720 is placed in the same position and the same direction as first dichroic mirror 120 shown in FIG. 2.

Total reflection mirror 730 is placed on the positive side of the Y axis from first dichroic mirror 720.

Figure 15:
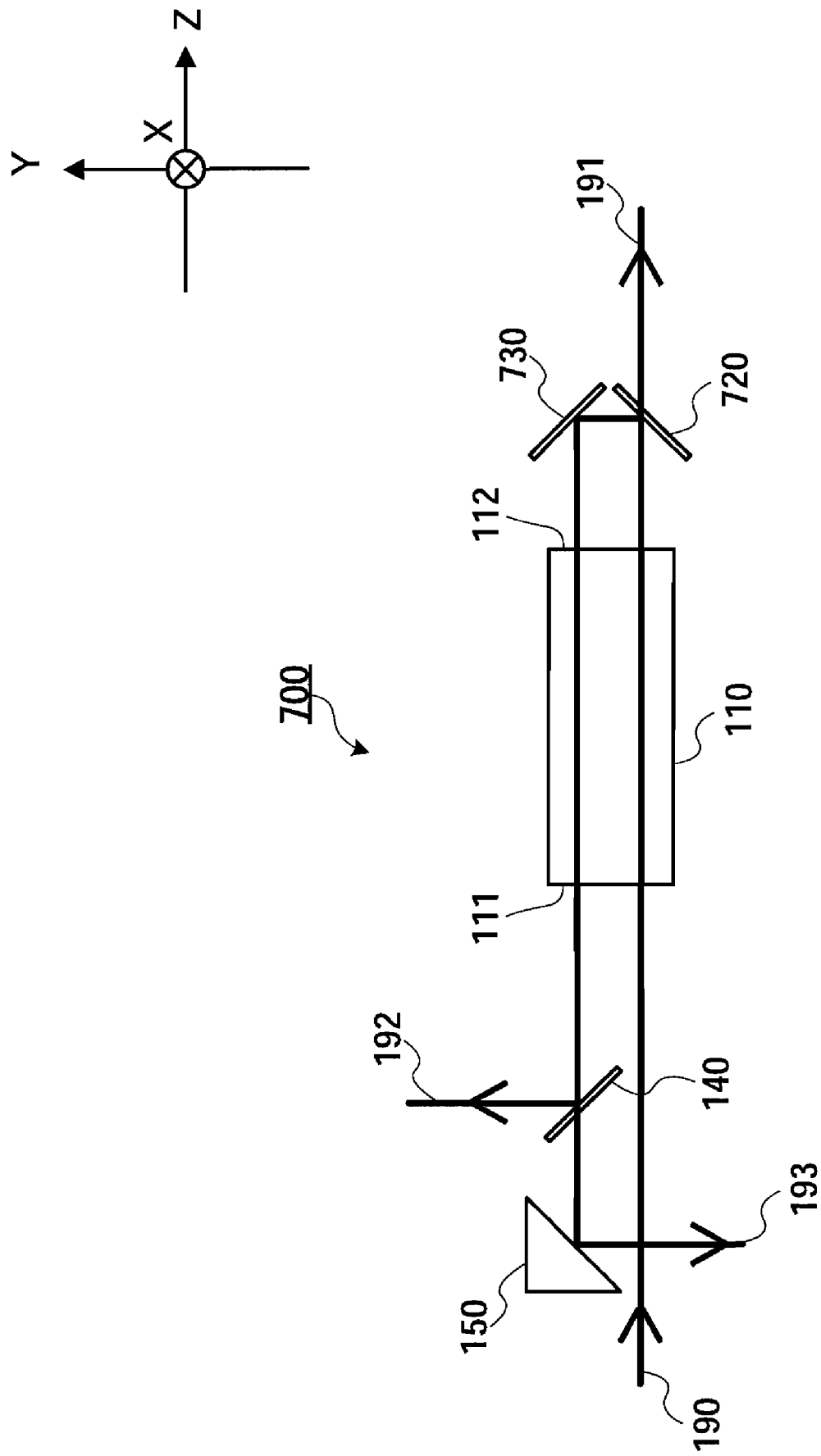
FIG. 15 is a configuration diagram of the wavelength converting apparatus according to Embodiment 7.

FIG. 15 is a configuration diagram of wavelength converting apparatus 700 shown in FIG. 14, and corresponds to FIG. 3 of Embodiment 1.

In FIG. 15, contrary to first dichroic mirror 120 shown in FIG. 2, first dichroic mirror 720 reflects first wavelength light (i.e. unconverted light) and transmits second wavelength light (i.e. converted light). That is, first dichroic mirror 720 reflects unconverted light in the positive direction along the Y axis and converted light in the positive direction along the Z axis.

Total reflection mirror 730 reflects first wavelength light (i.e. unconverted light) and second wavelength light (i.e. converted light). Total reflection mirror 730 is placed on the optical path of the unconverted light exiting from first dichroic mirror 720 such that its normal line direction is tilted forty five degrees in the negative direction along the Z axis with respect to the incoming direction of laser light 190. That is, by combining first dichroic mirror 720, total reflection mirror 730 deflects the unconverted light exiting from nonlinear optical crystal 110 at one hundred eighty degrees at a predetermined distance in the positive direction along the Y axis, and causes the unconverted light to re-enter nonlinear optical crystal 110.

According to this wavelength converting apparatus 700, first right angle prism 130 is no longer necessary, and it is possible to shorten the light path length of laser light 190 in the Z-axial direction. Further, first right angle prism 130, which at least has to be larger than the distance between the forward path and the return path of laser light 190, can be replaced with smaller total reflection mirror 730. Consequently, it is possible to make miniaturization, simplification and cost reduction of the wavelength converting apparatus.

A dichroic mirror that reflects unconverted light and transmits converted light, or a micro right angle prism may be placed instead of total reflection mirror 730. When a dichroic mirror to reflect unconverted light and transmit converted light is placed, it is possible to separate in a higher rate converted light from laser light 190 to re-enter nonlinear optical crystal 110.

Further, a total reflection mirror to reflect unconverted light and converted light may be placed instead of first dichroic mirror 720, and meanwhile, a dichroic mirror to reflect unconverted light and transmit converted light may be placed instead of total reflection mirror 730. In this case, the direction to emit converted light in can be the positive direction along the Y axis. This makes it possible to employ an optical system for combining converted light by half-wave plate 360 and polarizing beam splitter 370 of Embodiment 3 shown in FIG. 7. Further, aright angle prism applied total reflection coating may be used instead of the total reflection mirror by replacing with first dichroic mirror 720.

Further, a dichroic mirror to reflect unconverted light and transmit the converted light may only be replaced with total reflection mirror 730. By this means, one more process of removing converted light is added, so that it is possible to reduce the proportion of converted light included in light to re-enter.

Embodiment 8

Figure 16:
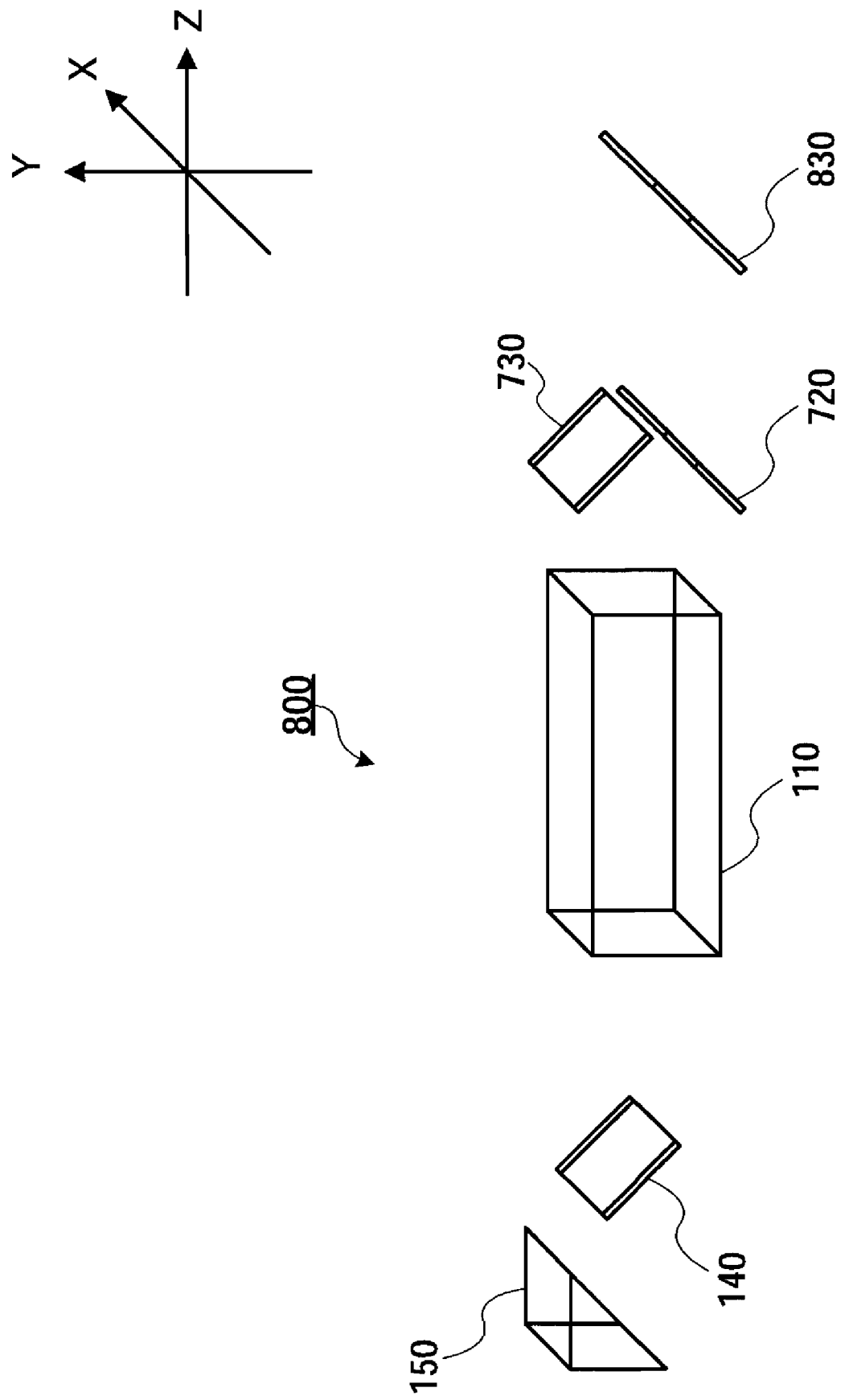
FIG. 16 is a perspective view showing an outline of the wavelength converting apparatus according to Embodiment 8.

FIG. 16 is a perspective view showing an outline of the wavelength converting apparatus according to Embodiment 8, and corresponds to FIG. 14 of Embodiment 7. The same parts as in FIG. 14 are assigned the same numerals, and therefore the explanation thereof will be omitted.

Referring to FIG. 16, wavelength converting apparatus 800 has second total reflection mirror 830, in addition to the configuration diagram of wavelength converting apparatus 700 shown in FIG. 14.

Second total reflection mirror 830 is placed in the positive direction along the Z axis with respect to first dichroic mirror 720.

Figure 17:
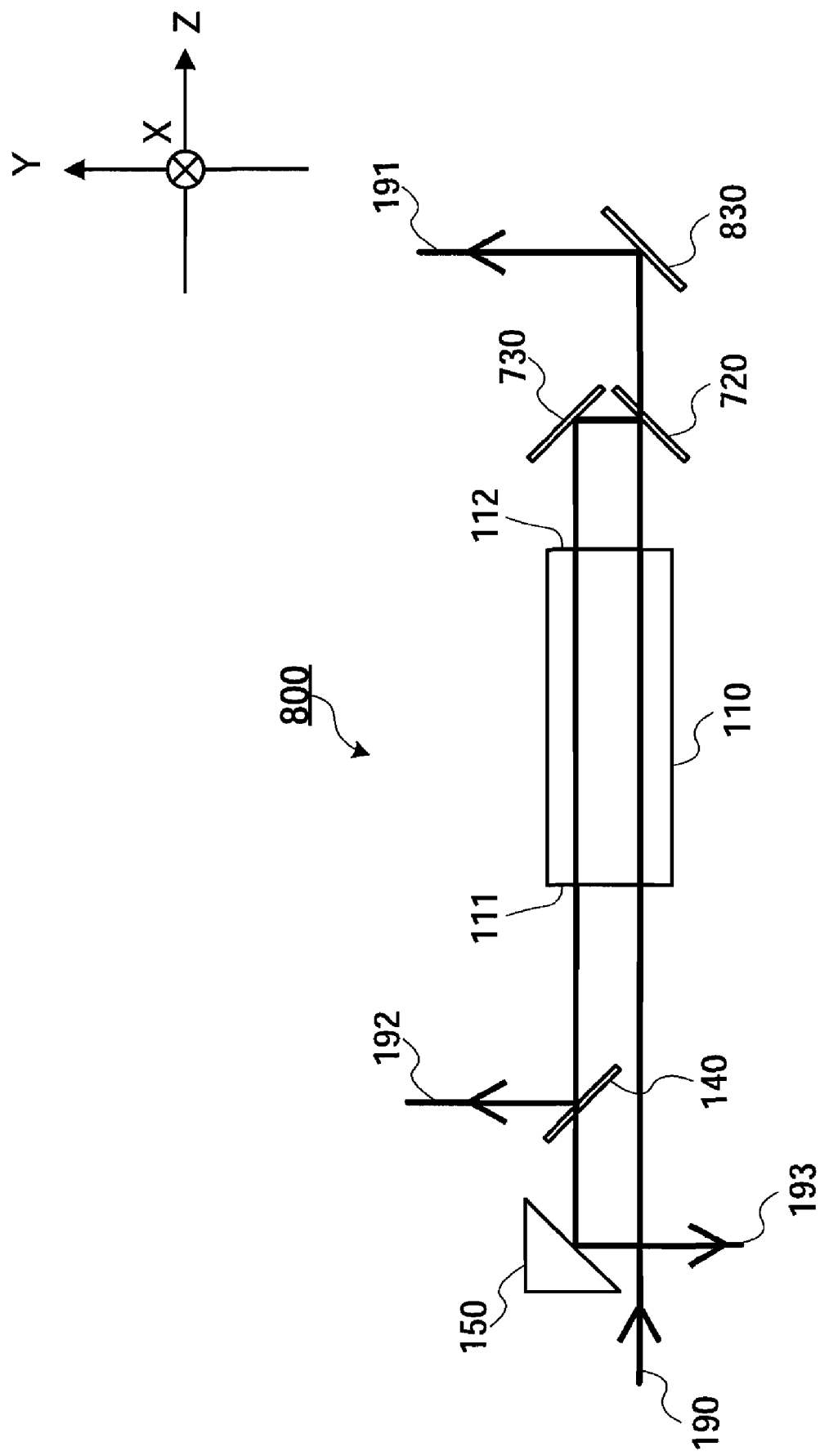
FIG. 17 is a configuration diagram of the wavelength converting apparatus according to Embodiment 8.

FIG. 17 is a configuration diagram of wavelength converting apparatus 800 shown in FIG. 16, and corresponds to FIG. 15 of Embodiment 7.

In FIG. 17, second total reflection mirror 830 totally reflects first wavelength light (i.e. unconverted light) and second wavelength light (i.e. converted light). Second total reflection mirror 830 is placed in parallel with first dichroic mirror 720, on the optical path of converted light exiting from first dichroic mirror 720. That is, second total reflection mirror 830 deflects converted light exiting from first dichroic mirror 720 in the positive direction along the Y axis.

According to this wavelength converting apparatus 800, as in Embodiment 1, it is possible that the direction of emitting first output converted light 191 outputted from first dichroic mirror 120 is the positive direction along the Y axis. This makes it easy to employ an optical system for combining converted light by half-wave plate 360 and polarizing beam splitter 370 of Embodiment 3 shown in FIG. 7.

Further, this wavelength converting apparatus emits converted light in the Y-axial direction at the position placing a distance in the positive direction along the Z axis from the part deflecting light, so that it is possible to improve flexibility of configuration of the wavelength converting apparatus. For example, other units may be placed in positions close to the Y axial direction of the part deflecting light. Further, it is possible to configure to set up the optical path difference between output converted light 191 and output converted light 192 longer and adjust the optical path difference easily between output converted light 191 and output converted light 192.

As described above, the wavelength converting apparatus according to the present invention is suitable for use as a wavelength converting apparatus that improves output performance of laser light whose wavelength is converted, while improving the efficiency of laser light wavelength conversion. To be more specific, laser light having a short wavelength and oscillating with difficulty can be easily outputted, so that, by combining other laser light sources adequately, it is possible to achieve a high-quality and high-output white laser light source. This white laser light source is applicable to, for example, various display apparatuses including light source apparatuses of projectors and backlight apparatuses of liquid crystal display, and, various function elements used in optical communication systems including wavelength multiplexing communication systems.

What is claimed is:

1. A wavelength converting apparatus comprising:
a nonlinear optical crystal that performs a wavelength conversion of laser light propagating inside the nonlinear optical crystal:
a light deflection section that causes laser light that has exited from the nonlinear optical crystal to deflect and re-enter the nonlinear optical crystal, and to propagate in parallel, in an opposite direction, at a predetermined distance with respect to the laser light before exiting from the nonlinear optical crystal; and
a light separation section that separates laser light whose wavelength is converted inside the nonlinear optical crystal, from the laser light before re-entering the nonlinear optical crystal.

2. The wavelength converting apparatus according to claim 1, further comprising a light convergence section that collects at least one of laser light that enters the nonlinear optical crystal and laser light that re-enters the nonlinear optical crystal, and places a beam waist of the converged laser light inside the nonlinear optical crystal.

3. The wavelength converting apparatus according to claim 1, further comprising a second light separation section that separates laser light whose wavelength is converted inside the nonlinear optical crystal from laser light that re-enters the nonlinear optical crystal and re-exits from the nonlinear optical crystal.

4. The wavelength converting apparatus according to claim 3, further comprising an optical system that combines the laser light separated in the light separation section and the laser light separated in the second light separation section.

5. The wavelength converting apparatus according to claim 1, wherein the light separation section comprises a dichroic mirror that demonstrates a reflective characteristic with respect to the laser light whose wavelength is converted inside the nonlinear optical crystal and that demonstrates a transmissive characteristic with respect to the laser light whose wavelength is not converted inside the nonlinear optical crystal.

6. The wavelength converting apparatus according to claim 5, wherein the dichroic mirror crosses both an optical path of the laser light before deflection in the light deflection section and the laser light after deflection in the light deflection section.

7. The wavelength converting apparatus according to claim 1, wherein the light separation section comprises a dichroic mirror that demonstrates a transmissive characteristic with respect to the laser light whose wavelength is converted inside the nonlinear optical crystal and that demonstrates a reflective property characteristic with respect to the laser light whose wavelength is not converted inside the nonlinear optical crystal.

8. The wavelength converting apparatus according to claim 1, wherein the light deflection section comprises a reflection face.

9. The wavelength converting apparatus according to claim 1, wherein the light deflection section comprises a right angle prism.

10. The wavelength converting apparatus according to claim 5, wherein the light deflection section deflects the laser light exiting from the nonlinear optical crystal using reflection of laser light in the dichroic mirror in the light separation section.

11. The wavelength converting apparatus according to claim 3, wherein the second light separation section comprises a dichroic mirror that demonstrates a reflective characteristic with respect to the laser light whose wavelength is converted inside the nonlinear optical crystal and that demonstrates a transmissive characteristic with respect to the laser light whose wavelength is not converted inside the nonlinear optical crystal.

12. The wavelength converting apparatus according to claim 3, wherein the second light separation section comprises a dichroic mirror that demonstrates a transmissive characteristic with respect to the laser light whose wavelength is converted inside the nonlinear optical crystal and that demonstrates a reflective characteristic with respect to the laser light whose wavelength is not converted inside the nonlinear optical crystal.

13. The wavelength converting apparatus according to claim 2, wherein the light convergence section comprises a pair of cylindrical lenses placed outside a laser light input side and a laser light output side of the nonlinear optical crystal.

14. The wavelength converting apparatus according to claim 2, wherein the light convergence section comprises at least a pair of microlens elements placed outside a laser light input side and a laser light output side of the nonlinear optical crystal.

15. The wavelength converting apparatus according to claim 2, wherein:
the light deflection section and the light separation section comprises a dichroic mirror that demonstrates a transmissive characteristic with respect to the laser light whose wavelength is converted inside the nonlinear optical crystal and that demonstrates a reflective characteristic with respect to the laser light whose wavelength is not converted inside the nonlinear optical crystal; and
the light convergence section comprises a pair of lens elements placed outside a laser light input side and a laser light output side of the nonlinear optical crystal.

16. The wavelength converting apparatus according to claim 4, wherein the optical system comprises a half-wave plate and a polarizing beam splitter.

17. The wavelength converting apparatus according to claim 1, wherein the nonlinear optical crystal comprises a harmonic generation element.

18. The wavelength converting apparatus according to claim 1, wherein the nonlinear optical crystal comprises a second harmonic generation element.

19. The wavelength converting apparatus according to claim 1, wherein the nonlinear optical crystal comprises a third harmonic generation element.

* * * * *